United States Patent

[11] 3,597,729

| [72] | Inventor | Lawrence A. Lopez |
| | | Dearborn, Mich. |
| [21] | Appl. No. | 781,029 |
| [22] | Filed | Dec. 4, 1968 |
| [45] | Patented | Aug. 3, 1971 |
| [73] | Assignee | Ford Motor Company |
| | | Dearborn, Mich. |

[54] AUTOMOTIVE VEHICLE CONDITION INDICATOR
1 Claim, 10 Drawing Figs.

[52] U.S. Cl. .................................................... 340/52 F,
180/72, 180/90, 340/214
[51] Int. Cl. .................................................... B60q 1/00
[50] Field of Search .............................................. 340/52 F,
52, 54, 63, 64, 214, 213, 326; 317/101 B, 101 F;
180/90; 174/68.5, 72 A

[56] References Cited
UNITED STATES PATENTS

| 2,511,631 | 6/1950 | Gordon | 340/52 F |
| 2,969,532 | 1/1961 | Ebel | 340/213 X |
| 2,977,429 | 3/1961 | Zimmerman | 317/101 B X |
| 2,923,860 | 2/1960 | Miller | 174/68.5 |
| 3,424,264 | 1/1969 | Long et al. | 180/90 |

Primary Examiner—John W. Caldwell
Assistant Examiner—Glen R. Swann
Attorneys—John R. Faulkner and Keith L. Zerschling ABSTRACT: This disclosure relates to an automotive vehicle condition indicator for warning the vehicle operator when one or more of the conditions relating to vehicle operations are abnormal or are in a certain predetermined state. It comprises a master warning lamp, preferably positioned in the primary field of vision of the vehicle operator, and a plurality of warning or condition indication lamps, one for each vehicle condition, located out of the primary field of vision of the vehicle operator. Means are connected to each of the condition indication or warning lamps and to the master warning lamp for lighting or energizing the master warning lamp and one of more of the plurality of condition indicator lamps when one or more of the conditions relating to vehicle operations is abnormal or is in the certain predetermined state. A unilateral conducting means is connected in circuit with the master warning lamp and with each of the condition indication or warning lamps for preventing energizing of the remainder of the vehicle condition indication or warning lamps when one of them is energized. In addition, a means is provided, actuated by the vehicle operator, for proving out the master warning lamp and the vehicle condition indication or warning lamps.

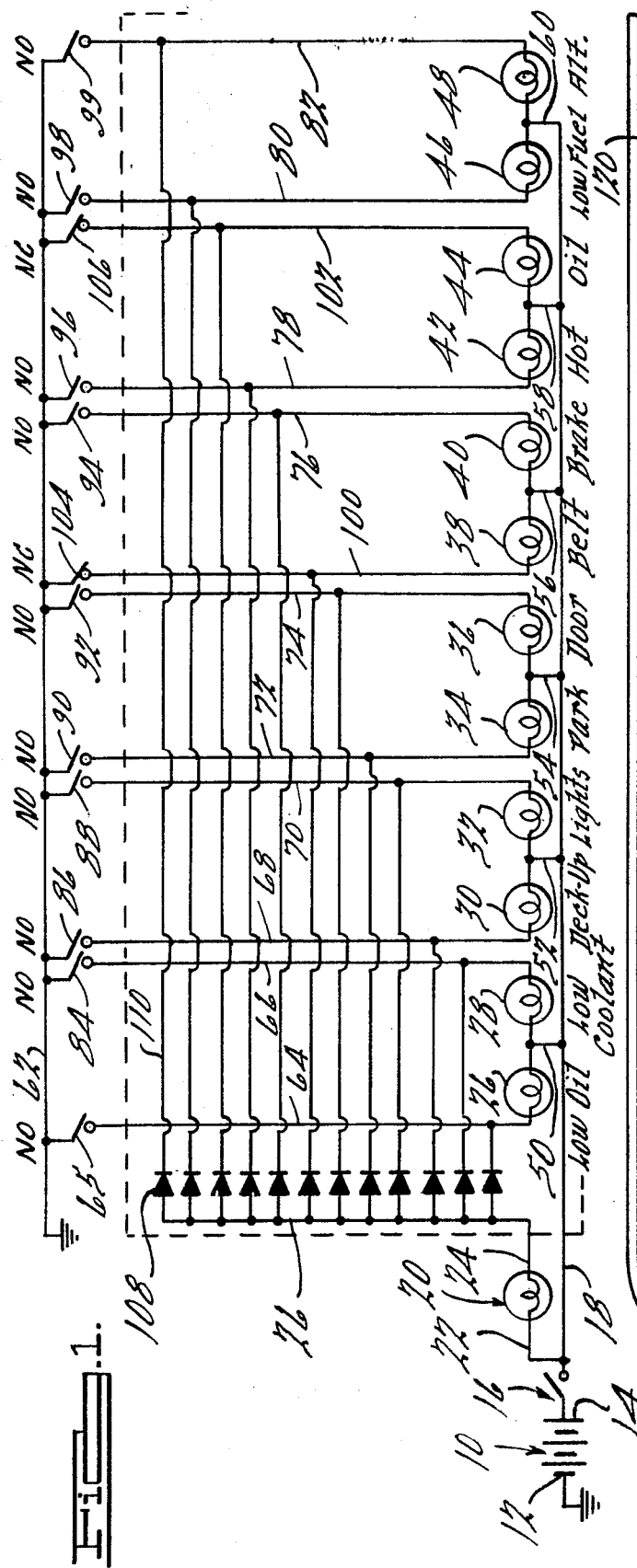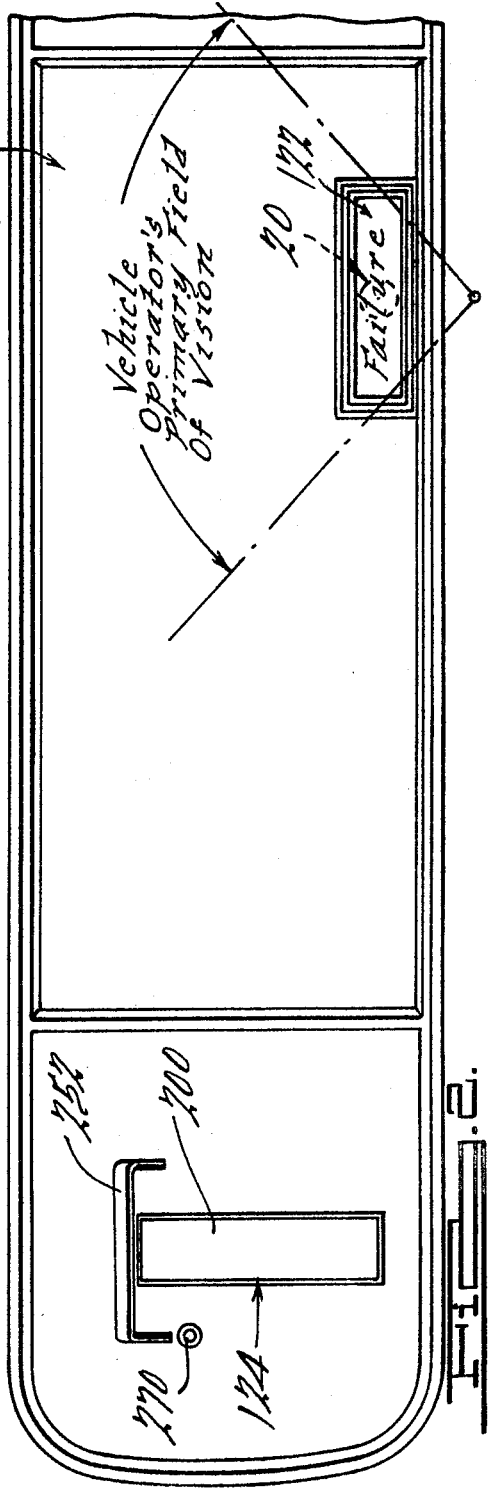

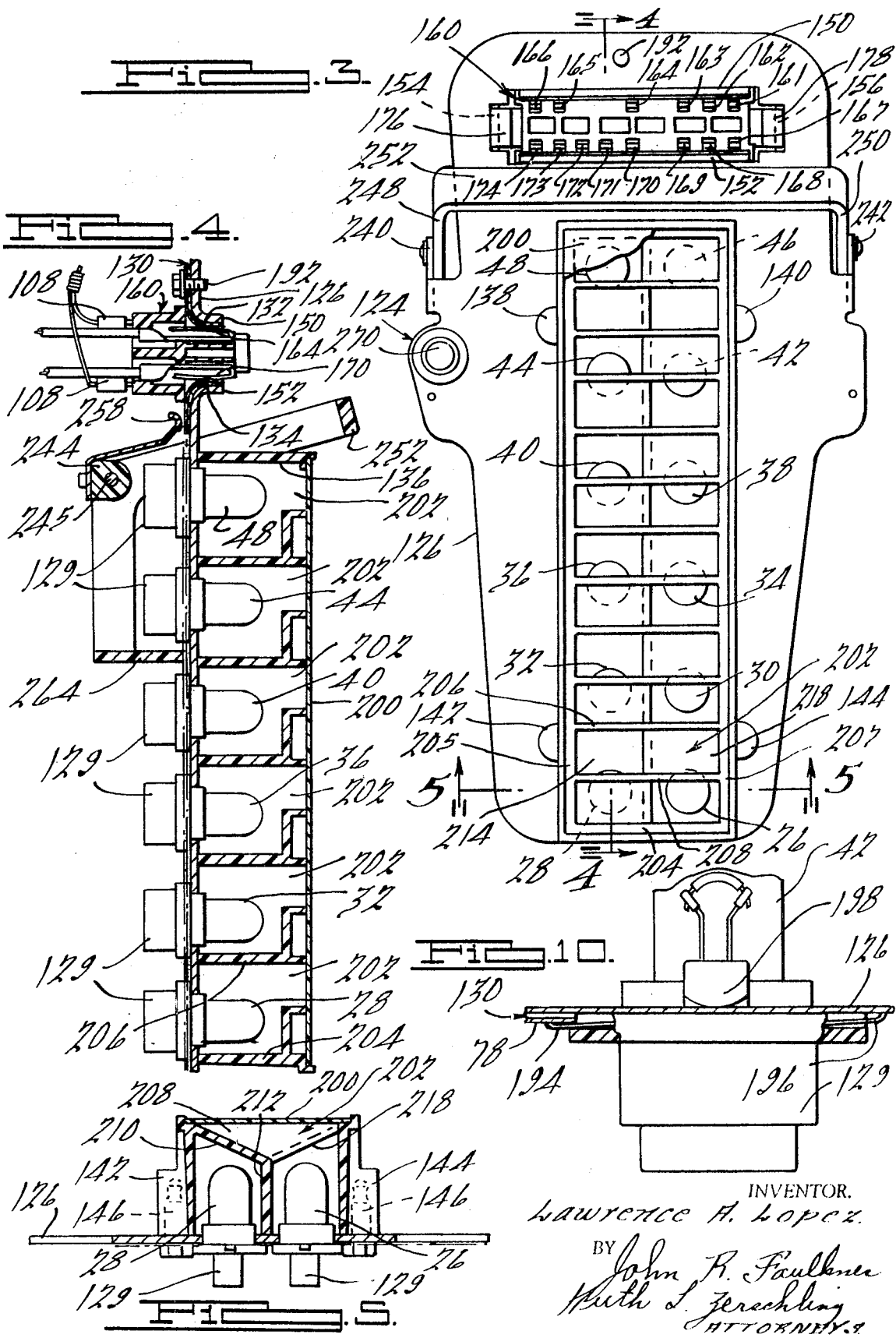

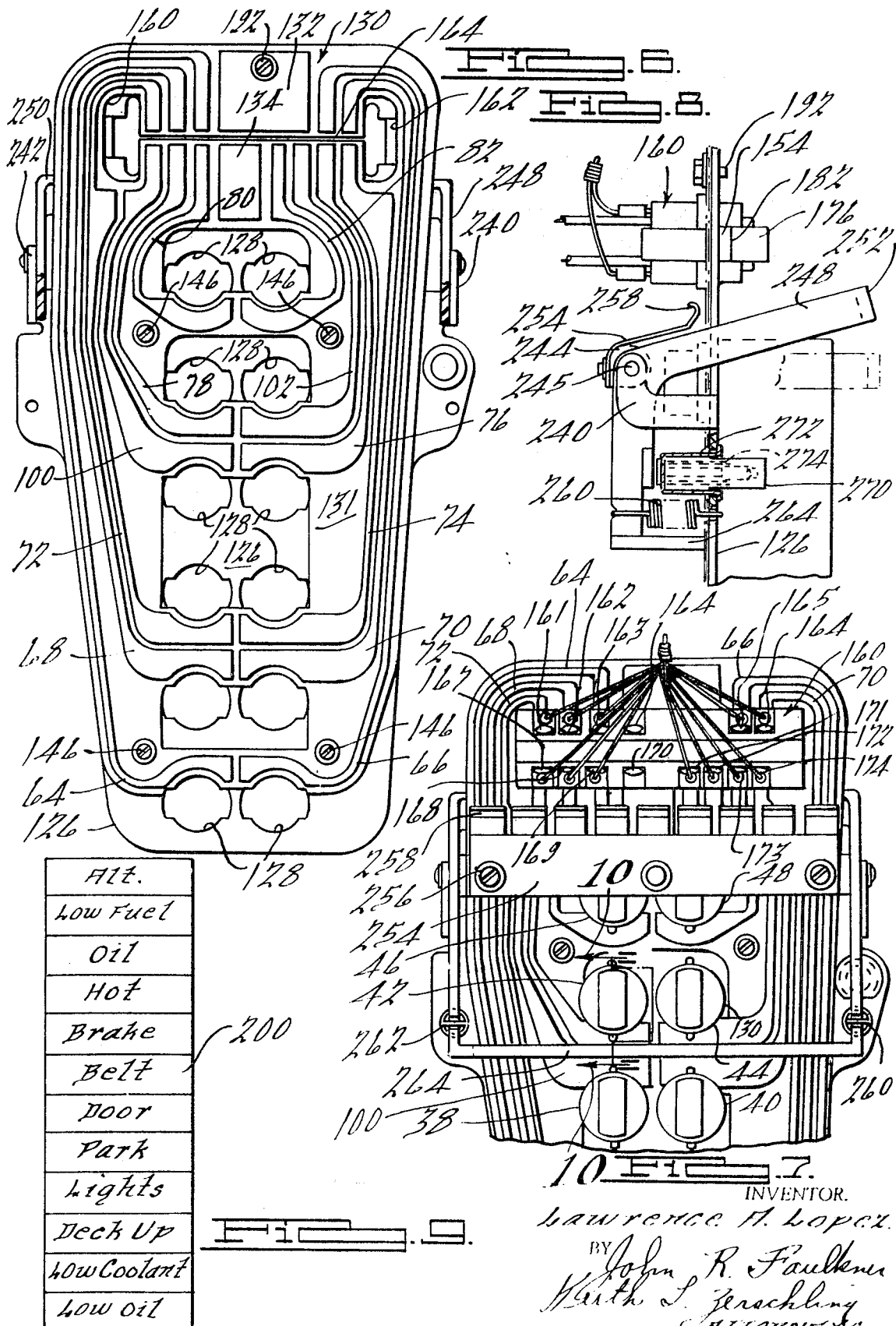

AUTOMOTIVE VEHICLE CONDITION INDICATOR

BACKGROUND OF THE INVENTION

This invention relates generally to the field of warning a vehicle operator when one or more vehicle-operating conditions is in an abnormal or predetermined state.

It is conventional in automotive vehicles to locate certain warning lamps in the area of the vehicle operator's forward vision for warning him of certain abnormal conditions in vehicle operation and for certain other purposes. For example, in current production vehicles, warning lamps are provided to indicate a discharging condition of the vehicle electrical system, to warn of low oil pressure or low fuel level, and also to alert the vehicle operator to the fact that the parking brake may be on and that the seatbelts have not been fastened. Additionally, warning lamps are provided in certain vehicles for indicating to the vehicle driver when the fluid pressure in the brake line is abnormally low. Prove-out circuits are provided for these lamps and certain lamps are energized when the ignition switch is turned to the "on" position, others are energized when the ignition switch is turned to the "start" position. With the great number of warning lamps in current vehicles, it is almost impossible for the vehicle operator to observe the array of lamps during the prove-out state due to their momentary energization and the random location of them in the driver's view. In some vehicles the close grouping of lamps produces a flashing effect which is very random. Thus, many vehicle operators do not know, even though this checkout or prove-out procedure is provided, whether the lamps and their circuits are functioning properly.

In addition, the wiring of all of these various lamps at different locations in the instrument panel adds system complexity to the wiring and instrument system. Also, the packaging of these warning lamps becomes difficult and creates many design and assembly problems.

The present invention overcomes the above mentioned difficulties by providing a single high-intensity master warning lamp, which may be of the flashing type, located in the vehicle operator's primary field of vision and a plurality of condition indication or warning lamps positioned in a compact housing or package that is located out of the vehicle operator's primary field of vision. When the master warning lamp is energized or illuminated, the vehicle operator may check the package or housing which contains the condition indication or warning lamps to identify the cause of the energization of the master warning lamp. In addition, a single vehicle-operator-actuated means, which may be in the form of a test bar or pushbutton, is provided to prove out all of the condition indication lamps and the master warning lamp. As a result, the vehicle operator may check all of the lamps at his leisure and at any interval or time that he wishes, even while he is driving.

SUMMARY OF THE INVENTION

This invention relates to a condition indicator for an automobile vehicle for warning the vehicle operator when one or more conditions in vehicle operations reaches an abnormal or predetermined state. It comprises a master warning lamp together with a plurality of the vehicle condition indication or warning lamps. Switching means are coupled to each of the warning lamps and are actuated when a vehicle operation condition reaches an abnormal or certain predetermined level. Electrical circuit means couple the master warning lamp, the condition indication or warning lamps and the electrical switching means for energizing the master warning lamp lamp and the condition indicator or warning lamps when such an abnormal or predetermined state occurs. The master warning may be of the flashing type and is mounted, preferably in the instrument panel, in the vehicle operator's primary field of vision and the condition indication or warning lamps are mounted in a cluster out of the vehicle operator's primary field of vision.

Unilateral conducting means are coupled between the master warning lamp and each of the condition indicating or warning lamps for preventing operation of all but the master warning lamp and the lamp that is energized as a result of a vehicle-operating condition reaching an abnormal or predetermined state. The unilateral conducting means, in other words, isolates each of the vehicle warning or condition indication lamps from the other vehicle warning or condition indication lamps.

The plurality of the condition indication or warning lamps are mounted in a cluster or housing positioned in the instrument panel of the vehicle and at a location which is out of the vehicle operator's primary field of vision. This housing may include a conductive backplate having a printed circuit means positioned against the backplate. The printed circuit means includes a plurality of conductors, positioned on the side of an insulating substrate opposite the conductive backplate. The conductive backplate has a plurality of openings positioned therein for the reception of sockets that each contain one of the vehicle condition indication or warning lamps.

An electrical terminal block is positioned within an opening in the backplate and has terminals or contacts positioned in electrical contact or engagement with the conductors of the printed circuit. One of these contacts is connected to the vehicle-charging system or source of electrical energy, for example, an electrical storage battery, and it contacts a first isolated conductive area of the printed circuit which in turn is electrically connected to the conductive backplate. One of the terminals of each of the warning lamps is positioned, through its lamp socket, in electrical contact with the conductive backplate. The terminal block also includes a contact which is in electrical engagement with a second isolated conducting surface or area of the printed circuit, and this contact of the terminal block is connected to ground or the other terminal of the source of electrical energy. The remainder of the contacts of the terminal block are connected through the unilateral conducting means mentioned above to the various operating switches or sensing means, for sensing when a vehicle-operating condition reaches a certain predetermined or abnormal state, thereby completing an electrical circuit through the particular vehicle condition indication or warning lamp and energizing it.

A vehicle-operator-actuated prove-out means for the master warning lamp and all of the vehicle condition indication or warning lamps is mounted on the housing for the condition indication or warning lamps. It includes a conductive bar or strip having a plurality of spring fingers that will engage the second isolated conductive area of the printed circuit that is connected to ground or to the other terminal of the source warning lamp is illuminated. For example, the warning lamps may energy and all of the electrical conductors connected to the lamp terminals when the vehicle operator actuates the above described means. Thus, actuation of this means by the vehicle operator completes a circuit through each of the vehicle condition indication or warning lamps, thereby energizing all of them if they are all in operative condition. If they are not all in operative condition, the vehicle operator may take remedial action to replace the bulb or otherwise repair the circuits. Simultaneously, a circuit is completed through the master warning lamp, thereby providing a prove-out means to enable the vehicle operator to determine whether the master warning lamp is operative.

Additionally, each condition indication or warning lamp may extend into a plastic housing which has a front face or cover constructed of a translucent material having an indicia or lettering positioned for each individual warning or condition-indicating lamp. This housing has certain baffles interposed between the condition indication or warning lamps so that only one of the indicia or lettering is illuminated when its corresponding condition indication or warning lamps may include a low fuel level lamp, a low oil pressure lamp, an abnormally high engine temperature coolant lamp, a door open warning lamp and a lamp that warns the vehicle operator when the parking brake is on. Suitable lettering or indicia are positioned on the front plate constructed of translucent material for indicating to the vehicle driver or operator which of the vehicle conditions has reached a certain predetermined or abnormal state.

An object of the present invention is the provision of an uncomplicated and inexpensive warning lamp system for an automobile vehicle in which one master warning lamp is positioned in the vehicle operator's field of vision while the remainder of the warning lamps that indicate when a vehicle-operating condition has reached a certain predetermined or abnormal state are located in a cluster or housing out of the primary field of vision of the operator.

Another object of the present invention is the provision of a warning lamp system for an automotive vehicle including a plurality of warning lamps located in a housing or cluster with vehicle-operator-actuated prove-out means mounted thereon.

A further object of the invention is the provision of a warning lamp system for an automotive vehicle that eliminates driver or vehicle operator confusion during the checkout or prove-out period and that will attract his attention when one or more operating conditions reaches a certain predetermined or abnormal state.

Other objects and attendant advantages of the present invention may be more readily realized as the specification is considered in connection with the attached drawings.

BRIEF DESCRIPTION OF THE DRAWINGS

FIG. 1 is a circuit diagram of the present invention.

FIG. 2 is a front elevational view of an instrument panel showing the location of the master warning lamp and the vehicle condition indication or warning lamps in the instrument panel and in relation to the position of the vehicle operator.

FIG. 3 is a front elevational view of the cluster or housing containing the vehicle condition indication or warning lamps together with vehicle operator actuated prove-out means.

FIG. 4 is a sectional view, partially in elevation, taken along the lines 4-4 of FIG. 3.

FIG. 5 is a sectional view, partially in elevation, taken along the lines 5-5 of FIG. 3.

FIG. 6 is a rear elevational view of the housing shown in FIG. 3 with portions thereof removed to show in detail the printed circuit arrangement.

FIG. 7 is a partial rear elevational view of the housing and prove-out mechanism of the present invention.

FIG. 8 is a side elevational view, partially in section, of the cluster or housing and showing two forms of the actuating means for the prove-out mechanism of the present invention.

FIG. 9 is a front elevational view of the front or indicia plate of the housing of the present invention.

FIG. 10 is a sectional view, partially in elevation, taken along the lines 10-10 of FIG. 7.

DESCRIPTION OF THE PREFERRED EMBODIMENT

Referring now to the drawings in which like reference numerals designate like parts throughout the several views thereof, there is shown in FIG. 1 a circuit diagram of the present invention in which a source of electrical energy 10, for example, an automotive vehicle storage battery, has one terminal 12 connected to ground and the other terminal 14 connected through ignition switch 16 to a line 18. The line 18, therefore, has applied to it a positive potential equal to the terminal voltage of the source of electrical energy 10 when the ignition switch 16 is closed. A master warning lamp 20, which is a high intensity lamp and may be of the flashing type, has one terminal 22 connected to line 18 and the other terminal 24 connected to line 26.

The plurality of the vehicle condition indication or warning lamps 26 and 28, 30 and 32, 34 and 36, 38 and 40, 42 and 44, 46 and 48 each have one terminal connected to the line 18 through leads 50, 52, 54, 56, 58 and 60, respectively.

The other terminal of lamp 26 is connected to line 62 through lead 64 and a normally open switch 65. Similarly, the other terminals of lamps 28, 30, 32, 34, 36, 40, 42, 46 and 48 are connected to the line 62 through similar leads 66, 68, 70, 72, 74, 76, 78, 80 and 82 and corresponding to normally open switches 84, 86, 88, 90, 92, 94, 96, 98 and 99. The other terminals of lamps 38 and 44 are connected to line 62 through leads 100 and 102 and normally closed switches 104 and 106, respectively. It should be noted that line 62 is connected to ground and to the negative terminal 12 of the source of electrical energy 10 through ground.

Each lead 64, 66, 68, 70, 72, 74, 76, 78, 80, 82, 100 and 102 is connected to line 26 through a unilateral conductive device 108, which is poled to permit current flow from line 26 to these leads, respectively, but prevents current flow from these leads to line 26 for purposes which will be discussed subsequently.

The normally open and normally closed switches are connected to sense when certain vehicle-operating conditions reach a certain predetermined or abnormal level. For example, switch 65 may be connected to a float in the crankcase of the vehicle, and is in a normally open position when the oil level is satisfactory, but closes when the oil reaches a critical low level; normally open switch 84 may be coupled to sense low coolant level and will close when the coolant level drops to a dangerously low level; the switch 86 may be coupled to the trunk deck lid and will be in a normally open position when the trunk lid is closed and will close when the deck lid is open; the switch 88 may be connected to a relay which will operate to close the switch when the vehicle operator opens the driver's door and the headlight switch is in the "on" position; switch 90 may be coupled to be operated by the brake pedal of the park brake, and will normally be open when the park brake is off and will close when the park brake is depressed to actuate the park brake; the switch 92 may be coupled to be actuated when a vehicle door is open, so that it is normally open when the door is closed and is closed when the door is opened; the normally closed switch 104 may be coupled to a timing circuit which is actuated when the ignition switch of the vehicle is turned to the "on" position and the switch will open after a given time; the normally open switch 94 may be coupled to the hydraulic brake system master cylinder and closes when the differential pressure between lines leading to the front wheel brakes to the rear wheel brakes exceeds a certain level; the normally open switch 96 may be of the bimetallic type and is connected to sense engine temperature, that is, the temperature of the engine coolant and when this temperature reaches a certain critical level the switch 96 will close; the normally closed switch 106 is a pressure switch connected to the lubricating pump of the vehicle and will open when the oil pressure in the lubricating system reaches a normal operating value; the normally open switch 98 is connected to sense the level of fuel in the fuel tank and will normally be open when the level of the fuel exceeds a certain critical low level and will close when this critical low level is reached; the normally open switch 99 is connected to the charging system of the vehicle and will be in a normally open position when the alternator of the vehicle is supplying charging current to the vehicle electrical system and will close when the electrical storage battery of the vehicle is discharging.

In operation of the invention described in FIG. 1, the line 18 will be energized when the ignition switch 16 is closed. As a result, a circuit will be completed through lamps 38 and 44 via the line 18 and leads 54 and 58, respectively, and through lead 100 and normally closed switch 104, and lead 102 and normally closed switch 106, respectively. At the same time the terminal 22 of master lamp 20 will be energized from the line 18 and a circuit will be completed through the lamp via the other terminal 24, line 26 and diodes 108 and leads 110 connected to leads 100 and 102, and through these leads to lead 62 through the normally closed switches 104 and 106. Thus, when the ignition switch 16 is first closed, both the master warning lamp 20, which may include internal flashing means, will be energized, as well as the two lamps 38 and 44. As brought out above, after a period of time the normally closed switch 104 will open to deenergize lamp 38 and when the engine of the vehicle is operating normally so that normal engine oil pressure is maintained, the normally closed switch 106 will open thereby deenergizing lamp 44. At this time also the master warning lamp 20 will be deenergized since it no longer has a path for current to flow from terminal 24 and line 26 to line 62 or ground.

Similarly, if during vehicle operation any of the normally open switches are closed due to the actions described above, their corresponding condition indication or warning lamps will be energized from lead 18 and simultaneously the master warning lamp 20 will be energized through the line 26, diode 108 and lead 110 to the lead connected to the switch or switches that have been closed.

It should be noted that when any of the switches, either the normally open switches or the normally closed switches discussed above, are closed, the line 26 will drop to substantially ground potential since it is connected to ground through the low forward resistance of the diode 108, lead 110, its corresponding lead and the normally closed switch. The remainder of the diodes block current that would otherwise flow from line 18 through the remainder of the lamps. In other words, the diodes 108 act as isolation diodes to prevent all of the lamps from being energized, i.e., lamps 26 through 48 when one of them is energized through its normally open or normally closed switch.

As shown in FIG. 2, the master warning lamp 20 is positioned in an instrument panel 120 in the primary field of vision of the vehicle operator. This master warning lamp 20 may be enclosed in a standard housing arrangement 122 with a translucent front cover having the word "FAILURE" inscribed thereon. The remainder of the lamps, i.e., the condition indication or warning lamps 26 through 48 are mounted in a housing 124 that is positioned outside the primary field of vision of the vehicle operator.

Referring now to FIGS. 3 through 10, the housing 124 comprises a backplate 126 preferably constructed of electrically conductive material, for example, steel. This backplate has a plurality of apertures 128 positioned therein that correspond in number to the number of condition indication or warning lamps. For example, 12 apertures are provided for the reception of 12 sockets 129 that receive the lamps 26 through 48.

A printed circuit arrangement 130 is positioned against the backplate 126 as best shown in FIG. 6 and it has an insulating substrate 131 positioned in engagement with the conductive backplate 126 and printed circuit conductors located thereon which comprises a portion of the leads 64, 66, 68, 70, 72, 74, 76, 78, 80, 100 and 102. The printed circuit means 130 also has a first isolated conductive surface or area 132 and a second isolated conducting surface or area 134 located on the insulating substrate 131.

A rectangular-shaped light-directing means 136 is mounted on the conductive backplate 126 opposite the printed circuit means 130. This light-directing means is constructed of an opaque insulating material, for example, molded opaque plastic, and it has four bosses 138, 140, 142 and 144 which serve to receive attaching screws 146 as shown in FIGS. 3 and 5. These attaching screws 146 serve to affix the light-directing means 136 to conductive backplate 126 and also serve to affix the printed circuit means 130 to the backplate.

The upper portion of the conductive backplate 126 has struck-out tabs 150, 152, 154, and 156 that form a rectangular aperture 158 for the reception of a standard electrical terminal block 160. The printed circuit means in this location has a pair of opposed apertures 160 and 162 connected by a slot 164, with the slot 164 being positioned over the horizontal centerline of the aperture 158. The electrical terminal block 160 has a plurality of contacts 161 through 174, with these contacts being positioned in engagement with the conductors on the printed circuit when the terminal block 160 is inserted in the aperture 158, as will be explained subsequently. The terminal block 160 also has a pair of outwardly extending arms 176 and 178 that have shoulders 182 and 184 positioned thereon, respectively, for engaging the edges of the struck-out tabs 154 and 156 to hold the terminal block 160 in position.

The contact 161 of the terminal block 160 engages the conductor 64 of the printed circuit means 130, contact 162 engages conductor 68, contact 163 engages conductor 72, contact 164 engages the first isolated conductive surface or area 132, contact 165 engages conductor 66, contact 166 engages conductor 70, contact 167 engages conductor 100, contact 168 engages conductor 78, contact 169 engages conductor 80, contact 170 engages the second isolated conductor area or surface 134, contact 171 engages conductor 82, contact 172 engages conductor 102, contact 173 engages conductor 76 and contact 174 engages conductor 74. As shown in FIG. 7 contact 164 is connected to lead 18, while the contact 170 is connected to ground through an extended lead 190. As can best be seen by reference to FIGS. 3 and 4, the first isolated conducting surface or area 132 is connected to the conductive backplate 126 by a conductive means, which may be in the form of a screw or pin 192 thereby energizing the conductive backplate 126 when the ignition switch 16 is closed.

As can best be seen by reference to FIG. 10, the lamp socket 129 shown has a pair of opposed terminals 194 and 196 which are positioned in engagement with the leads from the lamp 42. The terminal 194 as shown in this cross-sectional view is positioned in engagement with the conductor 78 and the other terminal 196 is positioned in direct engagement with the surface of conducting backplate 126. This is accomplished by means of a pair of opposed cams, one of which is shown at 198, that engage the surface of the conductive backplate 126 opposite the printed circuit means 130. The lamp socket 129 for each of the other warning lamps is similarly constructed and positioned so that one terminal 194 is positioned in engagement with a conductor and the other terminal 196 engages conductive backplate 126. Thus, each lamp is connected to the line 18 through the contact 164 of the terminal block 160, the first isolated conductive surface or area 132 on the printed circuit means 130, the pin or screw 192, and the conductive backplate 126.

An indicia plate 200 constructed of a translucent plastic material, for example, red polycarbonate plastic, is positioned over the front surface of the light-directing means 136. It is divided into 12 equal portions, as shown in FIG. 9, with the indicia shown in FIG. 1 positioned thereon, preferably in white letters.

Each pair of lamps, that is, lamps 26 and 28, lamps 30 and 32, lamps 34 and 36, lamps 38 and 40, lamps 42 and 44, and lamps 46 and 48 are enclosed within a chamber 202 in light-directing means 136. As shown specifically by reference to FIGS. 3, 4 and 5, each chamber 202 comprises a first transverse wall 204 and a second transverse wall 206 which extend across the light-directing means 136. A baffle structure is positioned within the chamber 202 such that lamp 26 will light the lowermost indicia, i.e., "Low Oil" and the lamp 28 will light the next indicia, i.e., "Low Coolant." The baffle structure comprises a central transversely extending triangular wall 208 positioned midway between the walls 204 and 206. Additionally, an angularly extending wall 210 extends, between sidewall 205 of the light-directing means 136 to a central outwardly extending wall 212 that is shorter than the sidewalls 205 and 207 of the light-directing means 136. Thus, light is directed from bulb 26 outwardly and is confined vertically by the triangular wall 208 and is diffused over the surface of the "Low Oil" indicia by the angular extending wall 210.

The central outwardly extending wall 212 and the angular extending wall 210 enclose the lamp 28 and prevent it from casting light on the lowermost indicia, i.e., "Low Oil." The lamp 28 does cast light into an upper rectangular chamber 214 where it is directed upon the next indicia, i.e., "Low Coolant," by a wall 216 that is positioned similarly to wall 212 and above it and by angularly extending wall 218 that is positioned similarly to wall 210, but extends in the opposite direction.

The two walls 216 and 218 also prevent light from lamp 26 from being directed onto the indicia "Low Coolant."

The vehicle-operator-actuated prove-out mechanism for checking the operability of the master warning lamp 20 and the condition indication or warning lamps 26 through 48 comprise means mounted on the conductive backplate 126. For this purpose a pair of L-shaped arms 240 and 242 are struck from the conductive backplate. A nonconductive bar 244 is mounted on a transversely extending pin 245 supported by the two L-shaped arms 240 and 242. A pair of nonconductive L-shaped levers 248 and 250 are also mounted on the pin 245 adjacent the arms 240 and 242, respectively and have a central bar 252 connected or formed integrally with them. The bar 244, constructed of nonconductive material, has a conductive sheet metal plate 254 affixed thereto by a plurality of screws 256. The conductive sheet metal plate 254 has a plurality of tongues 258 formed therein. As can best be seen by reference to FIGS. 6 and 7, a pair of tension springs are connected to the conductive backplate 126 and to the levers 248 and 250; and these springs are designated by the numerals 260 and 262. A transversely extending nonconductive stop bar 264 is affixed to the ends of the L-shaped levers 248 and 250 in the vicinity of the springs 260 and 262 to limit the movement of the arms 248 and 250 and the conductive sheet metal plate 254 and the tongues 258 in a counterclockwise direction into the position shown in FIGS. 4 and 8.

Depression of the central bar 252 into the dotted line position as shown in FIG. 8, will rotate the arms 248 and 250, the central bar 244 and the sheet metal conducting plate 254 with the tongues 258 formed therein in a clockwise direction against the bias of tension springs 260 and 262. As a result the tongues 258 will come into contact with all of the conductors positioned on the printed circuit and the second isolated conductive surface or area 134 that is connected to ground. This relationship can best be seen by reference to FIG. 7. This connects all of the conductors to ground, that is, conductors 64, 66, 68, 70, 72, 74, 100, 76, 78, 102, 80, 82 thereby energizing each of the lamps 26 through 48 to provide a proveout for these lamps. Additionally, as can be seen by reference to FIG. 1, the grounding of the leads or conductors 64, 66, 68, 70, 72, 74, 100, 76, 78, 102, 80 and 82 will energize the master warning lamp 20 to provide a proveout for it.

An alternate means for actuating the prove-out mechanism is shown in FIG. 8. This alternate means is a pushbutton 270 which is enclosed in a case 272 mounted in the conductive backplate 126. A spring 274 shown in the dotted lines biases the pushbutton 270 to the right as shown in FIG. 8. Depression of the pushbutton 270 to the left as shown in FIG. 8 rotates the mechanism against the bias of springs 260 and 262 so that the conductive tongues 258 of the sheet metal means 254 come in contact with the conductors and the second isolated conductive surface 134 as explained above.

The housing means 124 as previously stated is mounted in the instrument panel in the position shown in FIG. 2 and is mounted so that only the indicia plate 200 and the bar 252, if it is used, or pushbutton 270, if it is used, are exposed to the view of the vehicle operator. As a result of this construction, the vehicle operator may at his leisure proveout or check all of the lamps in the system for operability and he may do so even while he is driving. The invention thus eliminates the proveout of the various warning or condition-indicating lamps when the ignition switch is initially turned on or when the ignition switch is turned to the "start" position. It provides instead a prove-out mechanism that proves out all lamps when the vehicle operator desires to perform this operation.

Additionally, as stated above, the master lamp light is positioned in the primary field of vision of the vehicle operator and if one of the vehicle-operating conditions reaches a certain predetermined or abnormal state, the master warning lamp 20 will be energized. This lamp provides light of high intensity and it may be of the flashing type. It will, therefore, alert the operator of the vehicle that a vehicle-operating condition has reached a certain predetermined or abnormal state. He may then glance over at the indicia plate 200 of the housing mechanism 124 to determine which of the conditions has reached such a level. Positioning of the master warning lamp of high intensity and/or flashing type in the primary field of vision of the operator will attract his attention immediately when a vehicle-operating condition is in a predetermined state. Oftentimes this is not the case with the current warning lamps employed in vehicles, since they are often of low intensity and are positioned in different locations on the instrument panel. The attention of the vehicle operator, therefore, may not be directed immediately to a situation where a vehicle-operating condition has reached an abnormal or predetermined level.

Having thus described a preferred embodiment of my invention, what I claim and desire to secure by U.S. Letters Patent is:

1. A condition indicator for an automotive vehicle for warning the vehicle operator when one or more conditions in vehicle operations are in a predetermined state, comprising: a source of electrical energy; a master warning lamp; a plurality of condition indication lamps; a plurality of electrical sensing means, each of said plurality of sensing means being actuated when a predetermined operating state to be sensed by it occurs; a housing, said plurality of condition indication lamps being positioned in said housing, said housing including a backplate constructed of conductive material; a printed circuit mounted on said backplate, said printed circuit comprising an insulating substrate positioned against said backplate and electrical conductors positioned on the insulating substrate opposite said backplate, said printed circuit including a first isolated conductive area and a second isolated conductive area; electrically conductive means connecting said first isolated conductive area to said backplate; means positioned in said backplate for connecting said printed circuit to said source of electrical energy and to each of said electrical sensing means, said means comprising a terminal block having a plurality of contacts, one of said contacts being positioned in engagement with said first isolated conductive area, said contact being connected to said source of electrical energy, and said terminal block having a second contact positioned in engagement with said second isolated conductive area, said second contact being connected to ground; a prove-out switch means mounted on said housing, said switch means including an electrically conductive means connecting the printed circuit conductors to said second isolated conductive area when said switch means is actuated; means coupling each of said condition indication lamps to said source of electrical energy through said backplate and each of said condition indication lamps to one of said electrical sensing means through said printed circuit; and electrical circuit means coupling said master warning lamp to said source of electrical energy and to said condition indication lamps.